Figure 1:
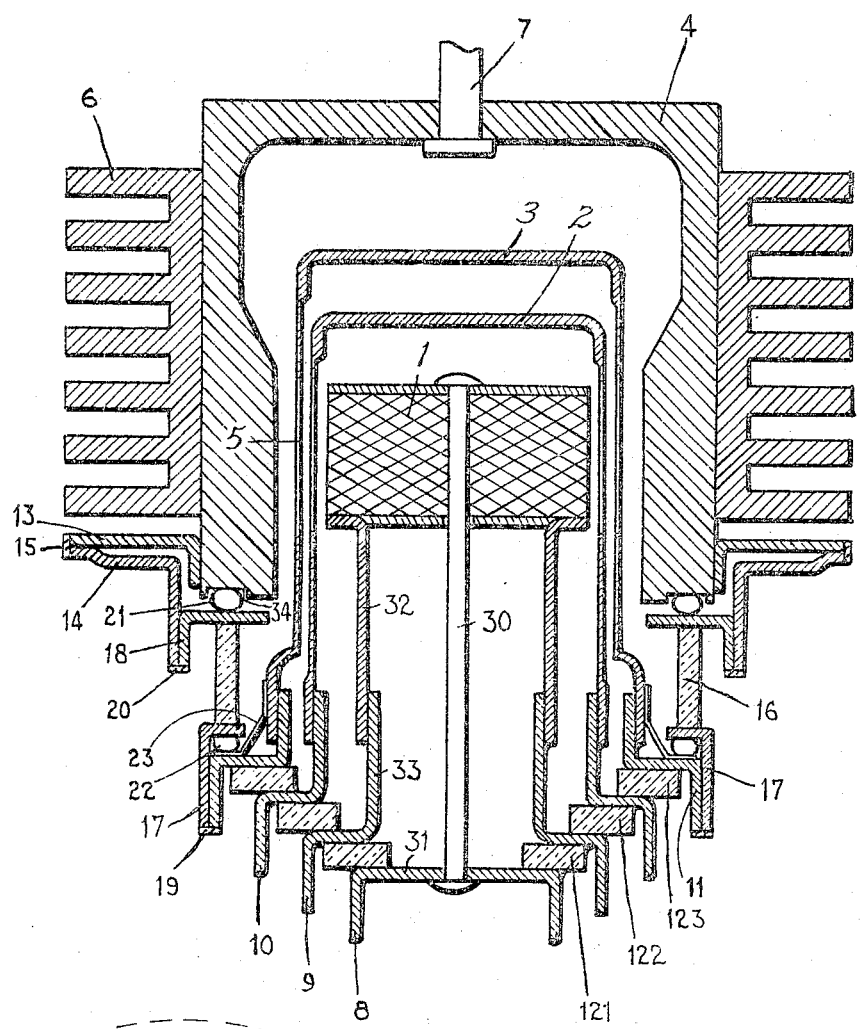

Inventor
Pierre Gerlach
by Michael J. Striker
Atty

United States Patent Office 3,327,156
Patented June 20, 1967

3,327,156
ELECTRON TUBE ASSEMBLY
Pierre Gerlach, Thonon-les-Bains, France, assignor to Compagnie Francaise Thomson Houston - Hotchkiss Brandt
Filed July 9, 1964, Ser. No. 381,479
Claims priority, application France, July 19, 1963, 942,046, Patent 1,391,703
8 Claims. (Cl. 313—250)

This invention relates to high-power electron tubes of the type in which the tube envelope is made up of a plurality of annular sections, including both metallic and insulating rings, sealingly interconnected with one another. Ultra high-frequency tubes are frequently constructed in this manner in cases where the tube may comprise a plurality of electrode sub-assemblies in order to permit separate manufacture of the relatively intricate sub-units prior to assembling them into a whole. The metallic ring sections serve as lead-out conductors for electrically connecting the electrodes inside the tube envelope to external terminals. The various annular envelope sections must be sealed with one another in an efficient manner to seal off the tube interior from the atmosphere.

Usually, in tube assemblies of this kind the metallic ring sections are first connected to the internal electrode structure of the respective sub-units, and are thereafter assembled with one another by means of peripheral welded or brazed seams, to provide a continuous, sealed envelope. This type of construction is not entirely satisfactory. In high-frequency and UHF operation, contacting metallic surfaces form highly imperfect conductive paths. Thus the currents tend to remain near the outermost surfaces of the metal parts by skin effect throughout the major parts of the paths from the electrodes to the tube terminals, and introduce high resistance into the tube connections with the external circuitry, which may be very detrimental to proper operation of the tube.

It is an object of this invention to provide an improved electron tube construction which will be easily and inexpensively manufactured in a plurality of sub-units where this may be desired, while providing extremely effective, low-resistance conduction paths from the inner electrodes to the tube terminals, and without extensive welding, soldering or brazing. Another object is to provide an improved tube structure, especially suitable for high-power high-frequency operation, in a plurality of sub-assemblies, in which the sub-assemblies can quite easily be dismantled during manufacture and in service, for instance in the case of damage to one of the sub-assemblies. This is an important advantage in the case of complex, large-size and large-power tubes in which it may frequently be worthwhile reusing expensive components of some of the sub-assemblies in case of damage to others.

The invention is based essentially on the use of compressible annular contact members in the form of rings of helically wound wire, retained in compressed relation between adjacent end surfaces of conductive metallic annular parts of adjacent sections of the tube envelope, thereby to provide a highly-conductive electric path between said parts, and metallic seal means, such as a welded, brazed or solder seam, sealing external peripheral portions of said annular parts to seal the interior of the envelope from the atmosphere and to contribute to holding said parts in assembly with said compressible contact member under substantial compression.

Figure 2:
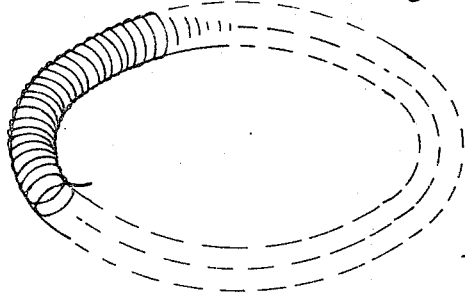

An exemplary embodiment of the invention will now be described for purposes of illustration but not of limitation with reference to the accompanying drawing, wherein FIG. 1 is an axial cross sectional view, somewhat simplified, of a UHF tube assembly constructed in accordance with the invention, and FIG. 2 is a fragmentary perspective view of a compressible contact member.

The tube assembly shown is generally characterized by a coaxial arrangement of all its main components, and includes an internally positioned cathode 1, in the form e.g. of a cylindrical ring of thoriated tungsten wire mesh. The cathode is surrounded by a control grid 2 and a screen grid 3, which may be molybdenum cylinders slotted as at 5 in the region surrounding the cathode 1. Lastly a cylindrical anode 4 constitutes part of the outer wall of the tube envelope, and may comprise a heavy copper cylinder surrounded with radiator fins 6 adapted to be positioned in a stream of air or other cooling fluid. An exhaust tubing 7 is shown as extending from the top centre of the anode.

An axial stem 30 secured to the centre of the cathode 1 extends downwardly therefrom and is attached at its lower end to the centre of a flanged metallic disc 31 which provides a first cathode connector element. A sleeve 32 projecting downward from the periphery of the cathode 1 is connected, e.g. brazed, to the upper end of another sleeve 33 constituting the second of the cathode connector elements. It will be noted that the cathode connector elements 31 and 33 have flat transverse disc portions which extend in axially spaced relation to one another and are secured to the opposite sides of a ceramic annular spacer member 121, by a suitable ceramic/metal seal. A method for providing such a seal has been described by J. E. Beggs in his patent for a Metallic Bond, U.S. Pat No. 2,857,663. Further, the connector elements 31 and 33 include flanges 8 and 9 respectively, projecting in parallel radially spaced relation to each other to provide connections with external circuit means, not shown.

Similarly, the lower ends of the control grid 2 and screen grid 3 are brazed or welded to the upper ends of connector elements 10 and 11 in the form of flanged sleeves as shown. The elements 10 and 11 again have axially spaced transverse portions which are connected by suitable metal/ceramic seals, with the adjacent flat surfaces of related annular ceramic spacers 122 and 123, the lower face of spacer 122 being joined in similar fashion to the upper transverse surface of the disc portion of corrector element 33 previously referred to. The connector elements 10 and 11 have downwardly projecting flanges for connection of the respective grids 2 and 3 with external circuitry. All the flanged connector elements such as 31, 33, 10 and 11 may be made of a suitable conductive alloy such as iron-nickel-cobalt.

The elements just described including the cathode, both grid electrodes and their depending connector parts may be considered as constituting an inner unit of the tube which may be conveniently pre-assembled separately from the rest.

An outer unit of the tube may be regarded as including the anode envelope section 4 together with the attached connector parts now to be described. These parts include a radial flange 13 which may be of soft iron, welded by means of an axial inner flange portion thereof to the base periphery of anode member 4. An anode connector element 14, e.g. of iron-nickel-cobalt alloy, has an outer flange or lip thereof soldered by means of a peripheral seam 15 to the outer lip of the flange 13, and has an axial inner flange portion projecting downwardly therefrom in spaced relation to the base of the anode member.

The tube assembly may be regarded as further including an intermediate connecting section, including a cylindrical ring 16 of ceramic material. Secured to the upper and lower axial ends of ring 16 are the transverse flange surfaces of respective annular elements 17 and 18, of iron-nickel-cobalt alloy. Element 17 has a downwardly extending axial flange part which fits tightly around the outer surface of the flange of connector element 11, and element 18 has a downwardly extending axial flange part which fits tightly inside the inner surface of the flange of connector element 14. The mating flanges of elements 17–11 on the one hand, and elements 18–14 on the other, are sealed together at their lower ends by means of welded or brazed seams 19 and 20 respectively. It may already be observed at this point that the welded seams 15, 19 and 20 participate in sealing the interior of the tube from the atmosphere, in conjunction with the metal/ceramic seals previously mentioned.

The interconnected flanges of elements 14–18 provide a connector for the anode member 4 with the external circuit, and for this purpose an electrically conductive path is established according to the invention in the following manner. The lower end surface of the copper anode member 4 is formed with an annular groove 34, and between the basewall of this groove and the upper surface of element 18 positioned below it, is interposed a compressive annular contact member 21. As partly shown in FIG. 2, this member 21 is formed as a helical winding of thin wire with closely spaced turns, formed into a toroid and having its ends juxtaposed and, if desired, interconnected through any suitable means not shown. Good results have been obtained when the member 21 has been formed from gold-plated tungsten wire about 0.2 mm. thick, wound into a helix about 5 mm. inner diameter. Another one similar helical compressible annular contact member 22 is shown interposed between the facing transverse surfaces of the flanged elements 11 and 17. Preferably, as shown, a plurality of small strips of foil 23, e.g. tantalum foil, are arranged in spaced relation around the circumference of the base of the screen grid member, and said strips have their vertical upper ends brazed to said member and have outwardly jutting lower ends clamped between the helical contact member 22 and the underlying upper transverse surface of connector element 11.

It will be understood that the sections of the tube assembly described are so mounted, with the two compressible annular contact members 21 and 22 inserted in place as shown, that when the welded or soldered seams 19 and 20 are applied, both said members 21 and 22 are retained under substantial compression with respect to the diameter of the helical turns. In these conditions it is found that the cross section of each helically wound member 21, 22 assumes an oval or elliptic shape, partly as a result of a flattening of the turns under the pressure applied thereto, and partly due to a tilting of all the turns with respect to the vertical. Excellent electrical contact is thus obtained across the helix of gold-plated wire.

Thus, considering the electric path from the anode member 4 to its associated connector 18–14, it will be noted that in the absence of the connector member 21 of the invention, high frequency currents would tend to flow along the longer path provided by the flanges of elements 13 and 14, being concentrated in the skin area of the metal thereof, and the resulting inductance, and what is more serious the resistance, of the connecting path would be greatly increased; in practice the current flow conditions in regard to high frequency operation would be substantially the same as though conductive contact were present only at the position of the welded or brazed seam 15. However, it is found that the helical contact member 21 used according to the invention provides an excellent low-resistance path shorting the longer path just described, thus correspondingly improving the operation of the tube in high-frequency, and this result is achieved without any welded, soldered or brazed connection between the anode and the underlying connector element 18. Thus the multisectional character of the tube assembly is preserved with its inherent advantages, including ease of assembly.

Somewhat similar conditions exist in respect to the lower compressible helical annular contact member 22, which serves to establish a low-resistance conductive path from the screen grid 3 to its associated connector element 11–17, as will be especially evident when considering the radially outer surface of the connector element 17. The foil connector elements 23, while not an essential part of the invention, are nevertheless preferred in this instance since they provide a convenient means of by-passing the interfitted portions of the elements 3 and 11, thereby further decreasing the resistance in the screen grid connection.

It should further be noted that the toroidal helical wire contact member 21 of the invention, while providing an excellent electric conducting path of low resistance from the anode to its connecting element, does not act to conduct a substantial amount of heat from said anode to said connecting element, and the flanged elements 13 and 14 also provide a path of relatively high thermal resistance, so that an objectionably large amount of heat does not tend to flow from the anode to its external connecting means.

The assembly described is quite easily taken apart into its component subunits should this be required. It is simply necessary for this purpose to cut through the peripheral metal seams 15, 19 and 21, whereupon the three main sections of the tube assembly will be readily separated without any interference from the contact members 21 and 22 of the invention.

It will be understood that various modifications may be made in the embodiment illustrated and described without exceeding the scope of the invention, both as regards the precise construction and dimensions of the helical toroidal wire contact member used, and also the constructional details of the electron tube to which this member is shown applied.

I claim:

1. An electron tube assembly having electrodes, said assembly comprising a multisection tube envelope formed, at least in part by annular parts located at adjacent ends of said electrodes, one of which parts connects with an electrode, a circumferential metallic seal joining external peripheral portions of said respective annular parts in coaxially spaced relation to seal the interior of the envelope from the atmosphere and to hold said parts and thus said electrodes of said electron tube in assembly;

wherein the improvement comprises means forming a low impedance electrical interconnection between the other of said parts to one of said electrodes, said low impedance interconnection means comprising a toroidal contact member in the form of a resiliently helical coil of wire formed into a ring, interposed between adjacent end surfaces of said parts to provide a low resistance electrical path from said one to said adjacent part electrically in shunt with said metallic seal;

said coaxial parts being retained by said circumferential seal at a separation of a distance less than the diameter of the helix to circumferentially compress the coils of said wire, the low resistance path from adjacent surfaces of said parts being short in comparison to the electrical path from one surface to the seal and then the other surface.

2. The tube assembly defined in claim 1, wherein said contact member comprises a helix of fine wire of material having relatively high resistivity, coated with a metal having high electrical conductivity.

3. The tube assembly defined in claim 1, including a plurality of circumferentially spaced conductive foil elements having their one ends metallically sealed to said electrode and their other ends clamped between said toroidal member and an adjacent surface of one of said parts.

4. An electron tube assembly as claimed in claim 1, wherein said toroidal contact member has good electrical conductivity at elevated frequency and poor thermal conductivity, and is formed of a gold-plated tungsten wire.

5. An electron tube assembly having electrodes, means defining a multi-section tube envelope including a plurality of coaxial annular sections, said sections including annular metallic surfaces at adjacent axial ends thereof, circumferential metallic flanges projecting radially outward from said surfaces and electrically connected thereto, and a circumferential metal to metal seal joining external peripheral portions of said respective flanges and to hold said annular sections in assembly;
  one of said surfaces being electrically connected to one of said electrodes;
  a toroidal contact member in the form of a compressible helix of wire formed into a ring interposed between said metallic surfaces to provide a low-resistance electric path therebetween;
  said external flanges axially spacing said annular sections by a distance less than the diameter of the helix so that the turns of the helix electrically in shunt with said metal to said metal seal will be under substantial compression with respect to the diameter of the helix.

6. The tube assembly defined in claim 5, wherein said flanges form part of means connecting said electrodes with external circuitry.

7. The tube assembly defined in claim 5, wherein at least one of said sections includes a spacer ring of ceramic material having one of said flanges sealed to an axial end surface thereof by a metal/ceramic joint.

8. An electron tube assembly as claimed in claim 5, wherein said toroidal contact member has good electrical conductivity at elevated frequency and poor thermal conductivity, and is formed of a gold-plated tungsten wire.

References Cited

UNITED STATES PATENTS

| | | | |
|---|---|---|---|
| 2,814,750 | 11/1957 | Polese | 313—250 X |
| 2,825,832 | 4/1958 | Cutler | 313—250 X |
| 2,909,698 | 10/1959 | Garner | 313—237 |
| 2,943,227 | 6/1960 | Levin | 313—256 X |
| 2,952,769 | 9/1960 | Eitel et al. | 313—250 X |
| 3,066,236 | 11/1962 | Sandbank | 313—250 |
| 3,132,274 | 5/1964 | Kendall | 313—250 X |

JOHN W. HUCKERT, *Primary Examiner.*

A. J. JAMES, *Assistant Examiner.*